United States Patent [19]

Sienkowski et al.

[11] Patent Number: 5,098,939
[45] Date of Patent: Mar. 24, 1992

[54] ANTISTATIC COMPOSITION

[75] Inventors: Kenneth J. Sienkowski, Bethlehem; Paritosh M. Chakrabarti, Pittsburgh, both of Pa.

[73] Assignee: PPG Industries, Inc., Pittsburgh, Pa.

[21] Appl. No.: 498,194

[22] Filed: Mar. 23, 1990

[51] Int. Cl.$^5$ ............................................... C08K 5/20
[52] U.S. Cl. .................................... 524/224; 524/310; 524/314; 524/317; 524/585; 524/910; 524/913
[58] Field of Search ............... 524/224, 310, 314, 317, 524/910, 913

[56] References Cited

U.S. PATENT DOCUMENTS

| | | | |
|---|---|---|---|
| 2,002,613 | 5/1935 | Orthaner et al. | 260/124 |
| 3,223,545 | 12/1965 | Gallagher et al. | 428/523 |
| 4,115,334 | 9/1978 | Gerow | 524/310 |
| 4,268,583 | 5/1981 | Hendy | 524/910 |

FOREIGN PATENT DOCUMENTS

| | | | |
|---|---|---|---|
| 42-17561 | 9/1967 | Japan | 524/913 |
| 384665 | 12/1932 | United Kingdom . | |

OTHER PUBLICATIONS

L. W. Burnette, *Nonionic Surfactants*, (edited by Martin J. Schick), pp. 396–403, 418–420 (1967).

*Primary Examiner*—Joseph L. Schofer
*Assistant Examiner*—Mark D. Sweet
*Attorney, Agent, or Firm*—George D. Morris

[57] ABSTRACT

Diethanolamine and triglyceride are reacted to produce a reaction mixture comprising diethanol amide of monocarboxylic acid and hydroxy-functional glyceride. The reaction mixture is useful as an antistatic composition for formulating with polymers, especially polyolefins.

9 Claims, No Drawings

ANTISTATIC COMPOSITION

BACKGROUND OF THE INVENTION

Diethanol amides of long chain monocarboxylic acids are known in the art as antistatic compounds (hereinafter "antistats") useful for incorporation into polyolefin polymers, especially polyethylene, polypropylene and/or copolymers of ethylene and propylene. One particularly demanding use for polyethylene containing such an antistat is as packaging material for packaging electronic components which comprise polycarbonate.

The commercial process for producing diethanol amide of long chain monocarboxylic acid comprises two separately conducted steps. In the first step, diethanolamine and a long chain monocarboxylic acid, alkyl ester (for example, methyl laurate), are reacted in the presence of an excess of the diethanolamine to produce a mixture comprising the diethanol amide of the long chain monocarboxylic acid and diethanolamine. Since the reaction otherwise tends to proceed only slowly, it is often conducted in the presence of a catalytic amount of a basic catalyst such as sodium methoxide which increases the reaction rate. The excess diethanolamine also serves to increase the reaction rate and to drive the reaction to substantial completion. In the case of methyl laurate, the temperature of the reaction is above the boiling point of methanol under the prevailing pressure and the reaction is customarily conducted under a slight vacuum with a nitrogen purge to sweep the methanol away substantially as it is formed. The reaction may be represented as follows:

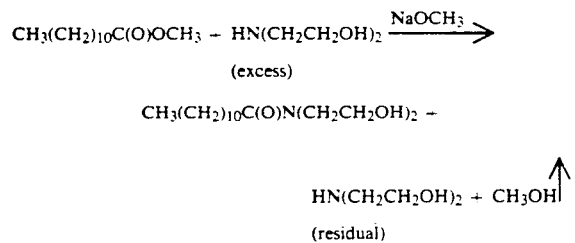

Diethanolamine is not an antistat and its presence serves to dilute the antistatic properties of the composition. Most importantly, however, diethanolamine reacts with the polycarbonate of the electronic components the packaging was intended to protect.

The second step of the commercial process therefore converts the residual diethanolamine to a material less harmful to polycarbonate. Long chain monocarboxylic acid (for example, lauric acid) is added to the first reaction mixture and reacted with the residual diethanolamine to form long chain monocarboxylic acid, N,N-bis(2-hydroxyethyl)ammonium salt, which ordinarily constitutes from about 5 to about 10 percent by weight of the resulting second reaction mixture. The reaction may be represented as follows:

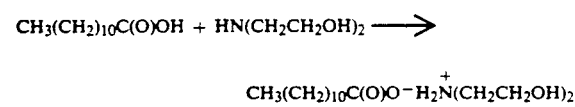

The ammonium salt is not an antistat and its presence dilutes the antistatic properties of the product composition. The product is often compounded with polyethylene at elevated temperatures, but at those temperatures the antistat composition does not have good thermal stability and a good deal of the ammonium salt degrades and forms volatile byproducts. Although the ammonium salt of fatty acids does not degrade polycarbonate as does diethanolamine, it can induce the corrosion of copper, solder, and other parts of the electronic components. Electronic components, and especially assembled circuit boards containing electronic components, are usually expensive and often must be stored for long periods of time in their packaging. The presence of more than inconsequential amounts of the ammonium salt of fatty acids renders the composition generally unfit for use in polyethylene packaging of electronic components and assembled circuit boards containing electronic components. As a matter of fact, the electronics packaging industry requires antistats that are substantially free from fatty acids and/or their salts.

THE INVENTION

It has now been discovered that diethanol amides of monocarboxylic acids (hereinafter "diethanol amide") may be produced together with one or more hydroxy-functional glycerides having some antistatic properties. The hydroxy-functional glyceride does not induce corrosion of copper or other materials normally present in electronic components. Since the hydroxy-functional glyceride coproduct has some antistatic properties of its own (although ordinarily not as pronounced as those of the diethanol amide) it has a lesser tendency than a non-antistat to dilute the antistatic properties of an antistatic composition also containing the diethanol amide.

Ignoring for the moment the possible differences in the acid portions of the glycerides, there are two isomers of the diglycerides (viz., 1,2-diglyceride and 1,3-diglyceride) and two isomers of the monoglycerides (viz., 1-monoglyceride and 2-monoglyceride). For purposes of the present invention such distinctions between isomers is for the most part unimportant.

In order to facilitate discussion, the following abbreviations will be used without distinction as to isomers:

| Triglyceride | G[OC(O)R]$_3$ | TG |
| --- | --- | --- |
| Diglyceride | G[OH][OC(O)R]$_2$ | DG |
| Monoglyceride | G[OH]$_2$[OC(O)R] | MG |
| Glycerol | G[OH]$_3$ | GL |
| RC(O)N(CH$_2$CH$_2$OH)$_2$ | | AS |
| Diethanolamine | | DEA | wherein G is the 1,2,3-propanetriyl group and each R is individually a hydrophobic hydrocarbon group.

The monoglycerides and the diglycerides have some antistatic properties. The triglycerides and glycerol do not have significant (if any at all) antistatic properties.

Accordingly, one embodiment of the invention is an antistatic composition comprising diethanol amide of monocarboxylic acid represented by the formula:

and hydroxy-functional glyceride which is monoglyceride represented by the formula:

diglyceride represented by the formula:

or a mixture thereof, wherein G is 1,2,3-propanetriyl and each R is independently a hydrophobic hydrocarbon group.

Another embodiment of the invention is a composition comprising polyolefin in admixture with an antistatic composition comprising diethanol amide of monocarboxylic acid represented by the formula:

RC(O)N(CH$_2$CH$_2$OH)$_2$ and hydroxy-functional glyceride which is monoglyceride represented by the formula:

G[OH]$_2$[OC(O)R]

diglyceride represented by the formula:

G[OH][OC(O)R]$_2$ or a mixture thereof, wherein G is 1,2,3-propanetriyl and each R is independently a hydrophobic hydrocarbon group.

Still another embodiment of the invention is a process comprising reacting diethanolamine and triglyceride represented by the formula:

G[OC(O)R]$_3$ to produce a reaction mixture comprising diethanol amide of monocarboxylic acid represented by the formula:

RC(O)N(CH$_2$CH$_2$OH)$_2$ and hydroxy-functional glyceride which is monoglyceride represented by the formula:

G[OH]$_2$[OC(O)R]

diglyceride represented by the formula:

G[OH][OC(O)R]$_2$ or a mixture thereof, wherein G is 1,2,3-propanetriyl and each R is independently a hydrophobic hydrocarbon group.

For any particular diglyceride the R-groups may be the same or they may be different. Any, some, or all of the R-group(s) of the hydroxy-functional glyceride may be the same as or different from that of the diethanol amide. The diethanol amide may be a single compound or it may be a mixture of different compounds.

In general each R is independently a hydrophobic hydrocarbon group. The various R's may be the same or they may be different. The hydrophobic hydrocarbon groups are well known and commonly used to impart hydrophobic functionality to surfactants. In most cases the hydrophobic hydrocarbon group contains from about 7 to about 29 carbon atoms. In many cases the hydrophobic hydrocarbon group contains from about 9 to about 17 carbon atoms. From about 9 to about 13 carbon atoms is preferred. Examples of hydrophobic hydrocarbon groups which may be used include straight or branched alkyl groups containing from about 7 to about 29 carbon atoms, straight or branched alkenyl containing from about 9 to about 21 carbon atoms, straight or branched alkadienyl containing from about 13 to about 21 carbon atoms, and

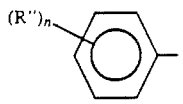

wherein each R" is independently straight or branched alkyl and the average value of n is in the range of from 0 to about 2.

When R is alkyl, it ordinarily contains from about 7 to about 29 carbon atoms. In many cases when R is alkyl, it contains from about 9 to about 17 carbon atoms. From about 9 to about 15 carbon atoms is preferred.

When R is alkenyl, it usually contains from about 9 to about 21 carbon atoms. Often when R is alkenyl, it contains from about 13 to about 21 carbon atoms. From about 17 to about 21 carbon atoms is preferred.

When R is alkadienyl, it ordinarily contains from about 13 to about 21 carbon atoms. About 17 carbon atoms is preferred.

When R is alkyl, alkenyl, or alkadienyl, it is preferably straight.

When R is the group of Formula (I), The average value of n is in the range of from 0 to about 2. Preferably the average value of n is about 1. Each R" is independently straight or branched alkyl containing from about 8 to about 12 carbon atoms. From about 8 to about 9 carbon atoms is preferred. Straight alkyl is preferred.

The preferred hydrophobic hydrocarbon groups are hydrophobic hydrocarbon groups corresponding to those attached to the carboxyl groups of long chain monocarboxylic acids. The especially preferred hydrophobic hydrocarbon groups are hydrophobic hydrocarbon groups corresponding to those attached to the carboxyl groups of long chain monocarboxylic acids derived from the triglycerides of natural fats or oils. Undecyl is particularly preferred.

Triglyceride may be viewed as reacting with diethanolamine in one or more of the following ways:

(a)TG + (a)DEA → (a)DG + (a)AS (b)TG + (2b)DEA → (b)MG + (2b)AS (c)TG + (3c)DEA → (c)GL + (3c)AS where the value of a represents the moles of triglyceride which are converted to diglyceride, the value of b represents the moles of triglyceride which are converted to monoglyceride, and the value of c represents the moles of triglyceride which are converted to glycerol.

The overall reaction may then be represented as follows:

$$\left[\frac{a+b+c}{a+2b+3c}\right]TG + DEA \longrightarrow$$

$$\left[\frac{a}{a+2b+3c}\right]DG + \left[\frac{b}{a+2b+3c}\right]MG +$$

$$\left[\frac{c}{a+2b+3c}\right]GL + AS$$

Since glycerol has low thermal stability when the antistatic composition is formulated with polymer and does not have significant antistatic properties, it is preferred that the value of c be small. It is especially preferred that the value of c be substantially zero. Similarly, since the triglyceride does not have significant antistatic properties, it is preferred that the amount of unreacted triglyceride in the final antistatic composition be small. It is preferred that the amount of unreacted triglyceride be substantially zero.

The triglyceride and the diethanolamine are ultimately introduced to the reaction at a molar ratio of triglyceride to diethanolamine in the range of from about 0.45:1 to about 1.1:1. Often the molar ratio is in the range of from a about 0.5:1 to about 1:1. From about 0.51:1 to about 0.56:1 is preferred. The additions of the reactants may be made simultaneously or sequentially in any order. The reaction may be conducted continuously, semi-continuously, batchwise, or semi-batchwise as desired.

Since the reaction otherwise tends to proceed only slowly, it is often conducted in the presence of a catalytic amount of a basic catalyst such as alkali metal alkoxide which increases the reaction rate. Ordinarily the alkali metal alkoxide contains from 1 to about 18 carbon atoms. Frequently the alkali metal alkoxide contains from 1 to about 2 carbon atoms. Preferably the alkali metal alkoxide is alkali metal methoxide. The alkali metal alkoxide is frequently sodium alkoxide or potassium alkoxide. Sodium alkoxide is preferred. The particularly preferred alkali metal alkoxide is sodium methoxide. Other basic catalysts may be used when desired.

The ratio of the weight of the basic catalyst introduced to the reaction to the sum of the weights of the triglyceride and diethanolamine introduced is ordinarily in the range of from about 0.0001:1 to about 0.01:1, although greater ratios may be used when desired. Frequently the ratio is in the range of from about 0.0005:1 to about 0.005:1.

The reaction is a liquid phase reaction.

Usually the reaction is a neat reaction, although substantially inert solvent may be used if desired.

In most cases the reaction is conducted under substantially anhydrous conditions.

The reaction is frequently conducted at temperatures in the range of from about 80° C. to about 150° C., although greater or lesser temperatures may be used when desired. In many cases, the reaction temperature is in the range of from about 80° C. to about 100° C. From about 80° C. to about 85° C. is preferred.

The pressure under which the reaction is conducted may vary widely. The pressure may be below, at, or above ambient atmospheric pressure. In most cases the reaction is conducted at about ambient atmospheric pressure or at a pressure that is below ambient atmospheric pressure. The pressure is frequently in the range of from about 0.13 to about 101 kilopascals, absolute. From about 1.3 to about 13.3 kilopascals, absolute, is preferred.

The molar ratio of the hydroxy-functional glyceride to the diethanol amide in the antistatic compositions of the first embodiment of the invention is ordinarily in the range of from about 0.4:1 to about 1:1. Often the molar ratio is in the range of from about 0.45:1 to about 0.7:1. From about 0.51:1 to about 0.56:1 is preferred.

The reaction may be conducted such that substantially all of the diethanol amide present in the final antistatic composition is produced by the above reaction. It is preferred, however, that the above reaction be used in conjunction with the first reaction of the prior art process for producing diethanol amide. Accordingly, it is preferred that diethanolamine be reacted with monocarboxylic acid, alkyl ester, in the presence of an excess of diethanolamine to produce a first reaction mixture comprising diethanol amide of monocarboxylic acid and unreacted diethanolamine, and then to react the residual diethanolamine in the first reaction mixture with triglyceride according to the principles described above.

Therefore, in a process for producing an antistatic composition wherein diethanolamine and monocarboxylic acid ester represented by the formula:

RC(O)OR' are reacted in the presence of an excess of diethanolamine to produce a first reaction mixture comprising diethanol amide of monocarboxylic acid represented by the formula:

RC(O)N(CH$_2$CH$_2$OH)$_2$ another embodiment of the invention is the improvement wherein residual diethanolamine in said first reaction mixture and triglyceride represented by the formula:

G[OC(O)R]$_3$ are reacted to produce a second reaction mixture comprising said diethanol amide of monocarboxylic acid and hydroxy-functional glyceride which is monoglyceride represented by the formula:

G[OH]$_2$[OC(O)R]

diglyceride represented by the formula:

G[OH][OC(O)R]$_2$ or a mixture thereof, wherein G is 1,2,3-propanetriyl, each R is independently a hydrophobic hydrocarbon group, and R' is an alkyl group containing from 1 to about 18 carbon atoms.

The above discussion in respect of R is also applicable in the case of this embodiment.

The molar ratio of the diethanolamine to the monocarboxylic acid ester ultimately introduced to the first reaction may vary considerably. Usually the molar ratio is in the range of from about 1:1 to about 2:1. In many cases the molar ratio is in the range of from about 1.01:1 to about 1.5:1. From about 1.05:1 to about 1.1:1 is preferred.

The first reaction is a liquid phase reaction. In many cases the reaction medium comprises two liquid phases. Methyl laurate and diethanolamine, for example, are substantially immiscible.

Usually the first reaction is a neat reaction, although substantially inert solvent may be used if desired.

In most cases the first reaction is conducted under substantially anhydrous conditions.

The first reaction is frequently conducted at temperatures in the range of from about 80° C. to about 150° C., although greater or lesser temperatures may be used when desired. In many cases, the reaction temperature is in the range of from about 80° C. to about 100° C. From about 80° C. to about 85° C. is preferred.

A benefit to employing monocarboxylic acid esters where R' contains one or only a few carbon atoms is that the byproduct alkanol can be swept out with an inert gas purge substantially as it is formed. In those cases where the boiling point of the byproduct alkanol is high such that it cannot be swept out as it is formed, it may be allowed to remain in the reaction mixture and then removed at the completion of the first or second reaction by conventional separation procedures well known to the art, such as for example, distillation under reduced pressure.

The pressure under which the reaction is conducted may vary widely. The pressure may be below, at, or above ambient atmospheric pressure. In most cases the reaction is conducted at about ambient atmospheric pressure or at a pressure that is below ambient atmospheric pressure. The pressure is frequently in the range of from about 0.13 to about 101 kilopascals, absolute. From about 1.3 to about 13.3 kilopascals, absolute, is preferred.

Since the first reaction otherwise tends to proceed only slowly, it is often conducted in the presence of a catalytic amount of a basic catalyst such as alkali metal alkoxide which increases the reaction rate. Ordinarily the alkali metal alkoxide contains from 1 to about 18 carbon atoms. Frequently the alkali metal alkoxide contains from 1 to about 2 carbon atoms. Preferably the alkali metal alkoxide is alkali metal methoxide. The alkali metal alkoxide is frequently sodium alkoxide or potassium alkoxide. Sodium alkoxide is preferred. The particularly preferred alkali metal alkoxide is sodium methoxide. Other basic catalysts may be used when desired.

The ratio of the weight of the basic catalyst introduced to the first reaction to the sum of the weights of the monocarboxylic acid ester and diethanolamine introduced is ordinarily in the range of from about 0.0003:1 to about 0.005:1, although greater ratios may be used when desired. Frequently the ratio is in the range of from about 0.0003:1 to about 0.001:1.

The second reaction may be conducted in accordance with the principles described above in respect of the reaction of diethanolamine with triglyceride.

The first reaction mixture, the second reaction mixture, or both reaction mixtures may optionally be passed through a bed of ion exchange resin, acid form, to remove the catalyst.

Because the diethanol amide of monocarboxylic acid appearing in the second reaction mixture is from two different reactions, the molar ratio of the hydroxy-functional glyceride to the diethanol amide in the second reaction mixture is usually less than if the second reaction were conducted alone. The molar ratio of the hydroxy-functional glyceride to the diethanol amide in the second reaction mixture is ordinarily in the range of from about 0.005:1 to about 0.5:1. Often the molar ratio is in the range of from about 0.01:1 to about 0.25:1. From about 0.025:1 to about 0.1:1 is preferred.

The antistatic composition comprising both diethanol amide of monocarboxylic acid and hydroxy-functional glyceride is especially useful for compounding with various polymers, especially but not necessarily the polyolefins, to impart antistatic characteristics to the resulting composition. The preferred polyolefins are polyethylene, polypropylene, and copolymers of ethylene and propylene. Since the antistatic composition may be compounded with polymer to form a concentrate which is then compounded with additional polymer to form the final end-use composition, the relative amounts of diethanol amide, hydroxy-functional glyceride, and polymer may vary widely. In most cases the ratio of the sum of the weights of the diethanol amide and the hydroxy-functional glyceride to the weight of the polymer is in the range of from about 0.0005:1 to about 1:1. Frequently the ratio of the sum of the weights of the diethanol amide and the hydroxy-functional glyceride to the weight of the polymer is in the range of from about 0.001:1 to about 0.01:1. From about 0.0025:1 to about 0.0075:1 is preferred.

The polymeric compositions of the invention may optionally also contain plasticizers, fire retardants, pigments, dyes, tints, resinous pigment dispersants, grinding vehicles, and the like. The listing of optional ingredients is by no means exhaustive. These and other ingredients may be employed in their customary amounts for their customary purposes so long as they do not seriously interfere with good polymer formulating practice.

Compositions comprising diethanol amide, hydroxy-functional glyceride, and polymer are usually prepared by simply admixing the various ingredients. This may be accomplished in many instances by milling. Most often the materials are admixed while the polymer is in the form of a melt. These compositions have antistatic characteristics and find many uses. Ordinarily they may be extruded into fibers, films, or other shapes, or molded, shaped, or formed into substantially any form. They are particularly useful for extrusion into films for use in packaging electronic components.

The compositions comprising diethanol amide and hydroxy-functional glyceride are preferably substantially free of diethanolamine. Similarly, polymeric compositions comprising polymer, diethanol amide, and hydroxy-functional glyceride are preferably substantially free of diethanolamine. The compositions comprising diethanol amide and hydroxy-functional glyceride are preferably substantially free of glycerol, and the polymeric compositions comprising polymer, diethanol amide, and hydroxy-functional glyceride are preferably substantially free of glycerol.

The invention is further described in conjunction with the following examples which are to be considered illustrative rather than limiting, and in which all parts are parts by weight and all percentages are percentages by weight unless otherwise specified.

EXAMPLE

A 250 milliliter, 3-necked round bottom flask equipped with an efficient mechanical stirrer, a calcium chloride guard tube, and a glass inlet tube for nitrogen flow, was charged with 96.75 grams (0.1512 mole) of coconut oil and 31.5 grams (0.30 mole) of diethanolamine. The two phase mixture was stirred well and the flask was immersed in an oil bath. Over a period of 30 minutes the temperature of the oil bath was raised to about 120° C.-125° C. and then held at 120° C.-125° C. for about 2¼ hours. While keeping the reaction mixture under a nitrogen atmosphere, 0.082 gram (0.0015 mole) of sodium methoxide was transferred into the reaction mixture. Within 10 minutes the reaction mixture was homogeneous. At fifteen minute intervals a small sample of the reaction mixture was withdrawn and diluted with acetonitrile. The diluted mixture was then analyzed by gas chromatography. At the end of 1½ hours after the sodium methoxide addition, gas chromatographic analysis showed the complete consumption of diethanolamine and the presence of no glycerol. The reaction mixture was cooled to room temperature and transferred into a bottle. The product was a thick, pale yellow liquid and weighed 118.09 grams. The yield of product was 92 percent.

Although the present invention has been described with reference to specific details of certain embodiments thereof, it is not intended that such details should be regarded as limitations upon the scope of the invention except insofar as they are included in the accompanying claims.

We claim:

1. A composition comprising polyolefin in admixture with an antistatic composition, said antistatic composition comprising:
   (a) diethanol amide of monocarboxylic acid represented by the formula:

$RC(O)N(CH_2CH_2OH)_2$ and
   (b) hydroxy-functional glyceride selected from the group consisting of:
      (1) monoglyceride represented by the formula:

$G[OH]_2[OC(O)R]$ (2) diglyceride represented by the formula:

$G[OH][OC(O)R]_2$ and
      (3) a mixture of said monoglyceride and said diglyceride.

wherein G is 1,2,3-propanetriyl and each R is independently a hydrophobic hydrocarbon group.

2. The composition of claim 1 wherein each said hydrophobic hydrocarbon group independently contains from about 7 to about 29 carbon atoms.

3. The composition of claim 1 wherein each said hydrophobic hydrocarbon group is independently straight or branched alkyl containing from about 7 to about 29 carbon atoms, straight or branched alkenyl containing from about 9 to about 21 carbon atoms, straight or branched alkadienyl containing from about 13 to about 21 carbon atoms, or

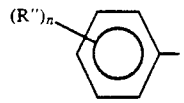

wherein each R" is independently straight or branched alkyl and the average value of n is in the range of from 0 to about 2.

4. The composition of claim 1 wherein each said hydrophobic hydrocarbon group is independently a hydrophobic hydrocarbon group corresponding to that attached to the carboxyl group of a long chain monocarboxylic acid derived from the triglyceride of a natural fat or oil.

5. The composition of claim 1 wherein each hydrophobic hydrocarbon group is undecyl.

6. The composition of claim 1 wherein the molar ratio of said hydroxy-functional glyceride to said diethanol amide is in the range of from about 0.005:1 to about 0.5:1.

7. The composition of claim 1 wherein the ratio of the sum of the weights of said diethanol amide and said hydroxy-functional glyceride to the weight of said polyolefin is in the range of from about 0.0005:1 to about 1:1.

8. The composition of claim 1 wherein said polyolefin is polyethylene.

9. The composition of claim 5 wherein:
   (a) the molar ratio of said hydroxy-functional glyceride to said diethanol amide is in the range of from about 0.025:1 to about 0.1:1;
   (b) the ratio of the sum of the weights of said diethanol amide and said hydroxy-functional glyceride to the weight of said polyolefin is in the range of from about 0.0025:1 to about 0.0075:1; and
   (c) said polyolefin is polyethylene.

* * * * *